(12) United States Patent
Kimura et al.

(10) Patent No.: US 7,458,625 B2
(45) Date of Patent: Dec. 2, 2008

(54) DECK CROSS-MEMBER AND METHOD OF MANUFACTURING A DECK CROSS-MEMBER

(75) Inventors: Yusuke Kimura, Susono (JP); Satoshi Yanagimoto, Susono (JP); Yoshiaki Ohhashi, Hoi-gun (JP)

(73) Assignee: Mitsubishi Aluminum Company, Ltd., Tokyo (JP)

( * ) Notice: Subject to any disclaimer, the term of this patent is extended or adjusted under 35 U.S.C. 154(b) by 0 days.

(21) Appl. No.: 11/806,934

(22) Filed: Jun. 5, 2007

(65) Prior Publication Data

US 2007/0296247 A1 Dec. 27, 2007

Related U.S. Application Data

(63) Continuation of application No. PCT/JP2006/313239, filed on Jul. 3, 2006.

(30) Foreign Application Priority Data

Jul. 6, 2005 (JP) ............................. 2005-197689

(51) Int. Cl.
*B62D 25/14* (2006.01)
(52) U.S. Cl. .......................................... 296/70; 180/90
(58) Field of Classification Search .................. 296/70; 180/90
See application file for complete search history.

(56) References Cited

U.S. PATENT DOCUMENTS 6,391,470 B1    5/2002    Schmieder et al.

FOREIGN PATENT DOCUMENTS

| DE | 42 32 846 A1 | 3/1994 |
|---|---|---|
| DE | 100 45 347 A1 | 3/2002 |
| JM | 5-305878 A | 11/1993 |
| JP | 5-5104 A | 2/1993 |
| JP | 9-277961 A | 10/1997 |
| JP | 2001-253368 A | 9/2001 |
| JP | 2002-2540 A | 1/2002 |
| JP | 2003-306169 A | 10/2003 |
| JP | 2004-189040 A | 7/2004 |

*Primary Examiner*—Lori L Lyjak
(74) *Attorney, Agent, or Firm*—Birch, Stewart, Kolasch & Birch, LLP

(57) ABSTRACT

A deck cross-member comprises a first pipe, a joint member, and a second pipe. The first pipe is configured to support a steering unit. The first pipe has a cross section that is uniform along the axial direction as viewed in a plane perpendicular to the axial direction. The joint member is inserted in the first pipe and secured to the first pipe. The joint member incorporates a receptacle unit. The second pipe is inserted in the receptacle unit of the joint member, thus secured to the joint member. The second pipe has a cross section that is uniform along the axial direction as viewed in a plane perpendicular to the axial direction.

11 Claims, 8 Drawing Sheets

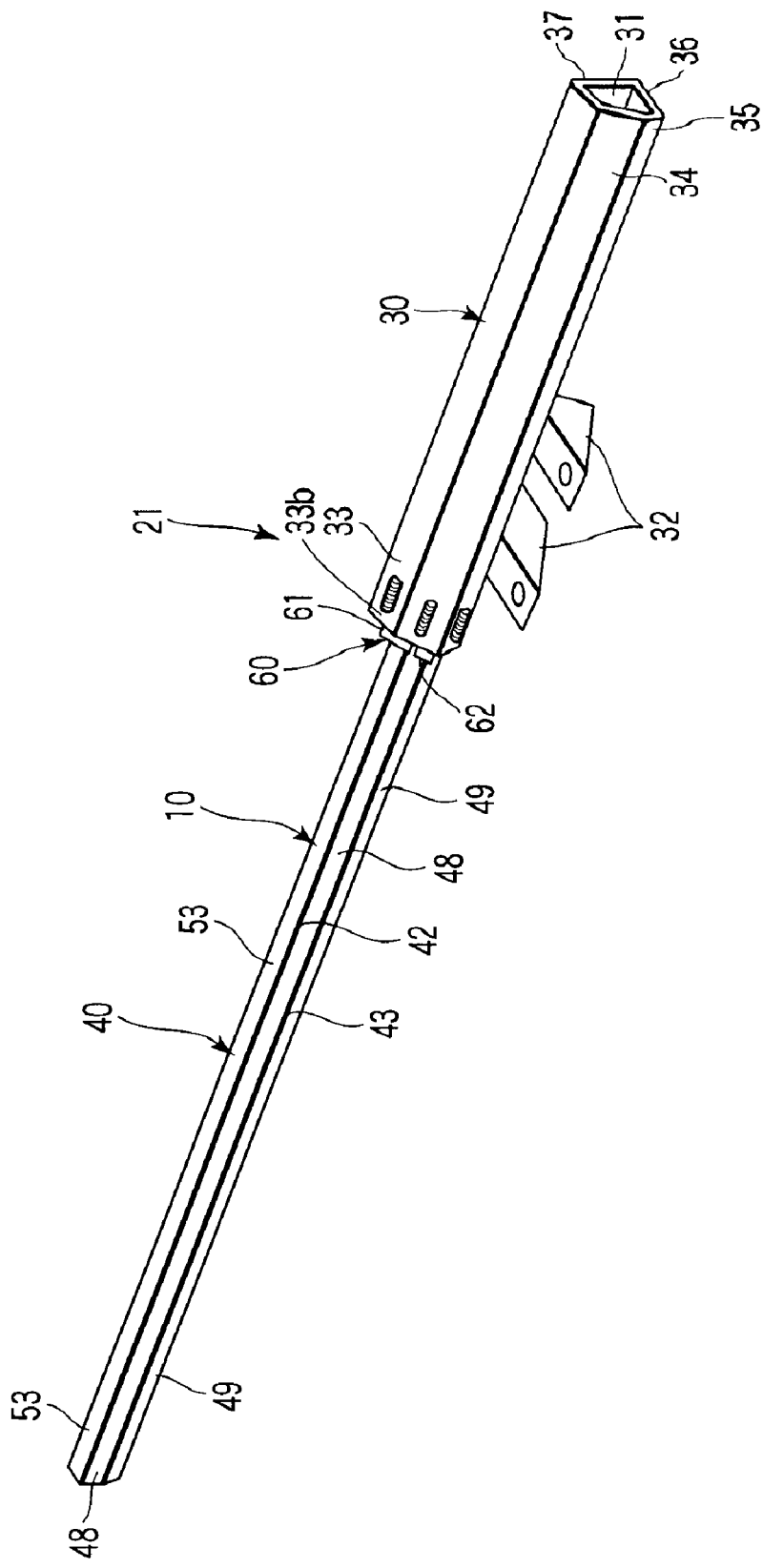
F I G. 2

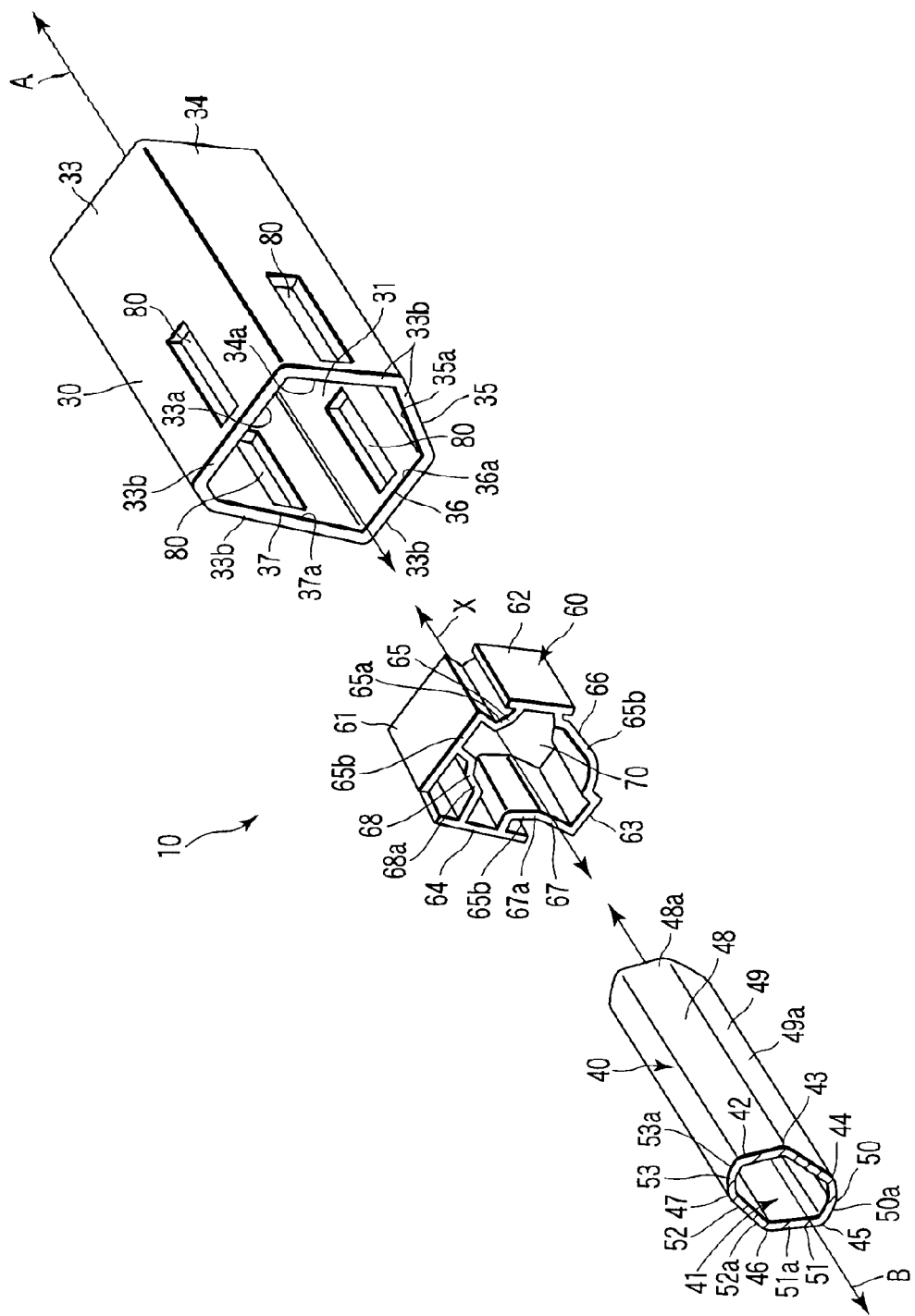
F I G. 3

DECK CROSS-MEMBER AND METHOD OF MANUFACTURING A DECK CROSS-MEMBER

CROSS REFERENCE TO RELATED APPLICATIONS

This is a Continuation Application of PCT Application No. PCT/JP2006/313239, filed Jul. 3, 2006, which was published under PCT Article 21(2) in Japanese.

This application is based upon and claims the benefit of priority from prior Japanese Patent Application No. 2005-197689, filed Jul. 6, 2005, the entire contents of which are incorporated herein by reference.

BACKGROUND OF THE INVENTION

1. Field of the Invention

The present invention relates to a deck cross-member for use in, for example, automobiles. The invention relates also to a method of manufacturing a deck cross-member for use in, for example, automobiles.

2. Description of the Related Art

In any automobile, a deck cross-member stretches between the front pillars that are arranged on both sides, spaced apart in the widthwise direction of the automobile. The deck cross-member supports the shaft part of the steering unit. In view of this, rigidity of the deck cross-member may be enhanced in order to support the shaft part more rigidly.

In order to enhance the rigidity of the deck cross-member, the cross section of the deck cross-member may be increased.

Most deck cross-members are constituted by a pipe, however. The pipe has been produced by extrusion molding. A pipe made by extrusion molding usually has a section that is uniform in the axial direction, in a plane view perpendicular to the axis.

Therefore, there is the tendency that a deck cross-member constituted by a pipe has a cross section that is large enough to support of the shaft a steering unit rigidly and reliably.

The deck cross-member thus made can indeed support the steering unit more rigidly. However, its weight increases. As its weight increases, its manufacturing cost rises. Hence, the increase in the weight of the deck cross-member is not desirable.

In view of this, there has been proposed a deck cross-member that can more rigidly support the shaft part of a steering unit, without increasing its weight so much.

More specifically, this deck cross-member comprises a pipe having a large cross section and a pipe having a small cross section. The pipe having the large cross section is arranged at the side closer to the driver's seat. The pipe having the small cross section is arranged at the side closer to the passenger's seat. Some deck cross-members of this type have been proposed.

A deck cross-member of this type comprises a pipe that has a large cross section, because it is to be arranged at the side closer to the driver's seat and needs to support the steering unit rigidly. The pipe therefore improves the rigid supporting of the steering unit. The deck cross-member has a pipe that has a small cross section, because it is to be arranged at the side closer to the passenger's seat and does no serve so much to support the steering unit rigidly. This pipe therefore helps to reduce the weight of the deck cross-member. Such a deck cross-member is disclosed in Japanese Patent KOKAI Publication No. 9-277961.

One of the pipes constituting a deck cross-member of this type is expanded or contracted in terms of diameter, and the pipes are fitted one into the other. The two pipes are thereby coupled with each other.

BRIEF SUMMARY OF THE INVENTION

The deck cross-member disclosed in Jpn. Pat. Appln. KOKAI Publication No. 9-277961 has a pipe that has been expanded or contracted in terms of diameter. Therefore, the pipe is, for example, an iron pipe that can be expanded or contracted in diameter.

To be light in weight, a deck cross-member should preferably be made of, for example, an aluminum pipe that is lighter than an iron pipe.

It is difficult, however, to expand or contract aluminum pipes. Therefore, an aluminum pipe can hardly be used to provide a deck cross-member of the type disclosed in Jpn. Pat. Appln. KOKAI Publication No. 9-277961.

Thus, the material of pipes that may be used to manufacture the deck cross-member disclosed in Jpn. Pat. Appln. KOKAI Publication No. 9-277961 is inevitably limited.

It is not desirable that the material of pipes used to manufacture deck cross-members is limited, because this reduces the freedom of reducing the weights of deck cross-members.

Accordingly, an object of the present invention is to provide a deck cross-member that is effectively light in weight.

Another object of the present invention is to provide a method of manufacturing a deck cross-member, in which two pipes having different cross sections are connected to each other.

A deck cross-member according to the present invention comprises a first pipe, a joint member, and a second pipe. The first pipe is configured to support a steering unit. The first pipe has a cross section that is uniform along the axial direction as viewed in a plane perpendicular to the axial direction. The joint member is inserted in the first pipe and secured to the first pipe. The joint member incorporates a receptacle unit. The second pipe is inserted in the receptacle unit of the joint member, thus secured to the joint member. The second pipe has a cross section that is uniform along the axial direction as viewed in a plane perpendicular to the axial direction.

In the deck cross-member thus configured, the first pipe and the second pipe can be coupled, without deforming their abutting ends. More precisely, the end of the first pipe need not be contracted in diameter, or the end of the second pipe need not be expanded.

Therefore, the first and second pipes can be made of material that cannot withstand such deformation. Thus, they can be aluminum pipes and are relatively light.

Thus, there is no limitation to the materials that can be used for the first and second pipes. As a result, the freedom of reducing the weights of the first and second pipes will increase.

In a preferred configuration of the deck cross-member, the first pipe has a plurality of inner surfaces which extend in the axial direction of the first pipe and which face an inside of the first pipe, and the second pipe has a plurality of outer surfaces which extend in the axial direction of the second pipe and which face an outside of the second pipe.

This configuration makes it possible for the first and second pipes to be coupled to the joint members at more joint sections than otherwise. The pipes can therefore be firmly coupled to the joint member.

In another preferred configuration of the deck cross-member, an elongated through hole is made in at least one of the inner surfaces of the first pipe and opens at the outer circumferential surface of the first pipe, and the joint member is coupled to a rim of the through hole and secured to the first pipe.

With this configuration, the joint section between the joint member and the first pipe is long. The joint member can therefore be firmly coupled to the first pipe.

In still another preferred configuration, the joint sections between the first pipe and the joint member and joint sections between the second pipe and the joint member are alternately arranged in a circumferential direction of the joint member.

With this configuration, the first pipe and the second pipe can be coupled rigidly enough, reducing the number of joint sections.

In a further preferred configuration according to this invention, the joint sections between the first pipe and the joint member and the joint sections between the second pipe and the joint member are alternately arranged in a circle around an axial direction of the joint member.

With this configuration, the first and second pipes are coupled more firmly.

In another configuration according to this invention, at least one of the first and second pipes is made of aluminum.

Having this configuration, the deck cross-member can be light, can be manufactured at low cost and can be improved in the dimensional precision of components.

A method of manufacturing a deck cross-member, according to the present invention, is designed to manufacture a deck cross-member that comprises a first pipe, a joint member and a second pipe, according to the present invention. The first pipe is configured to support a steering unit. The first pipe has a cross section uniform along an axial direction as viewed in a plane perpendicular to the axial direction. The joint member is inserted in the first pipe and secured to the first pipe. The second pipe is inserted in the receptacle unit of the joint member and secured to the joint member. The second pipe has a cross section uniform along an axial direction as viewed in a plane perpendicular to the axial direction.

In the method of manufacturing a deck cross-member, the first pipe and the second pipe are formed by extrusion molding, the second pipe is inserted into the receptacle unit of the joint member, the second pipe and the joint member are secured to each other, the joint member is inserted into the first pipe, and the joint member is secured to the first pipe, thereby forming a deck cross-member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a perspective view of the deck cross-member shown in FIG. 1;

FIG. 3 is an exploded perspective view of the deck cross-member shown in FIG. 1;

DETAILED DESCRIPTION OF THE INVENTION

A deck cross-member according to the first embodiment of this invention will be described, with reference to FIGS. 1 to 9.

Figure 1:
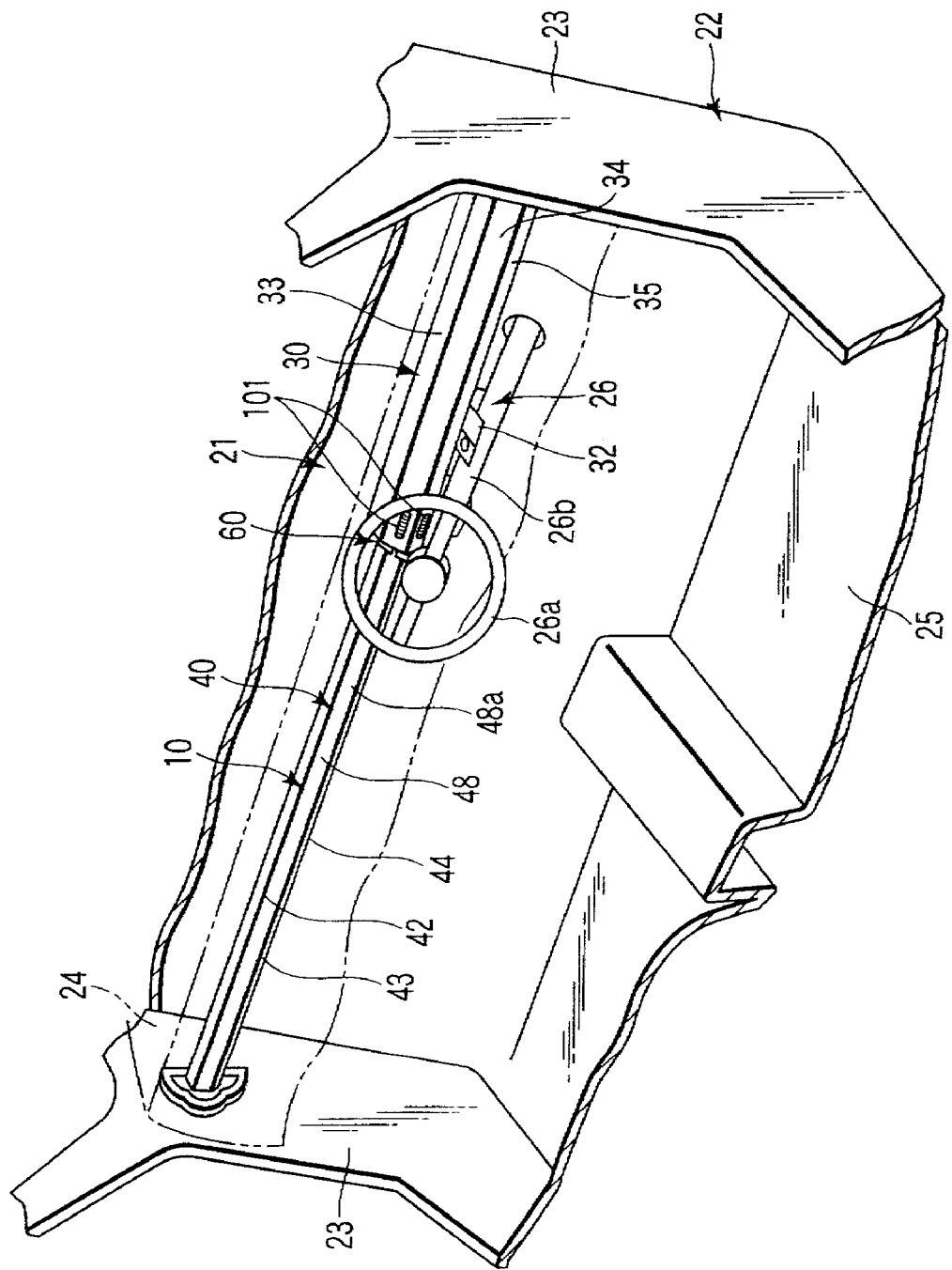
FIG. 1 is a perspective view of the front section of the car body that has a deck cross-member according to a first embodiment of the present invention.

FIG. 1 is a perspective view of the front section of the car body 22 that has a deck cross-member 10 according to the first embodiment of this invention. As shown in FIG. 1, a pair of front pillars 23 are secured to the front part 21 of the car body 22. The front pillars 23 are spaced apart in the widthwise direction of the automobile, each provided at one side of the car body 22.

Between the front pillars 23, an installment panel 24 is provided. The installment panel 24 is indicated by a two-dot, dashed line in FIG. 1. The deck cross-member 10 is arranged in the installment panel 24. The deck cross-member 10 holds the installment panel 24 and reinforces the car body 22.

The deck cross-member 10 is arranged between the front pillars 23. It extends from one front pillar 23 to the other front pillar 23. The deck cross-member 10 is supported, at both ends, by the front pillars 23.

A steering unit 26 is provided at that part 25 of the car body 22, which lies at the side of the driver's seat. The steering unit 26 comprises a steering wheel 26a, a steering shaft 26b, and the like.

The steering wheel 26a is coupled to the steering shaft 26b. As FIG. 1 shows, the steering shaft 26b is supported by the deck cross-member 10.

FIG. 2 is a perspective view of the deck cross-member 10. As described above, the deck cross-member 10 is provided in the installment panel 24. In the installment panel 24, an air conditioner and some other components are provided, too.

In view of this, the deck cross-member 10 is designed not to interfere with the other component contained in the installment panel 24.

FIG. 3 is an exploded view of the deck cross-member 10. As shown in FIGS. 2 and 3, the deck cross-member 10 comprises a first pipe 30, a second pipe 40, and a joint member 60.

The deck cross-member 10 is constituted as the joint member 60 couples the first and second pipes 30 and 40 together. As shown in FIG. 1, the deck cross-member 10 has the first pipe 30 located at the side of the driver's seat (that is, at steering unit 26) and the second pipe 40 located at the side of the passenger's seat (or besides the driver's seat).

Figure 4:
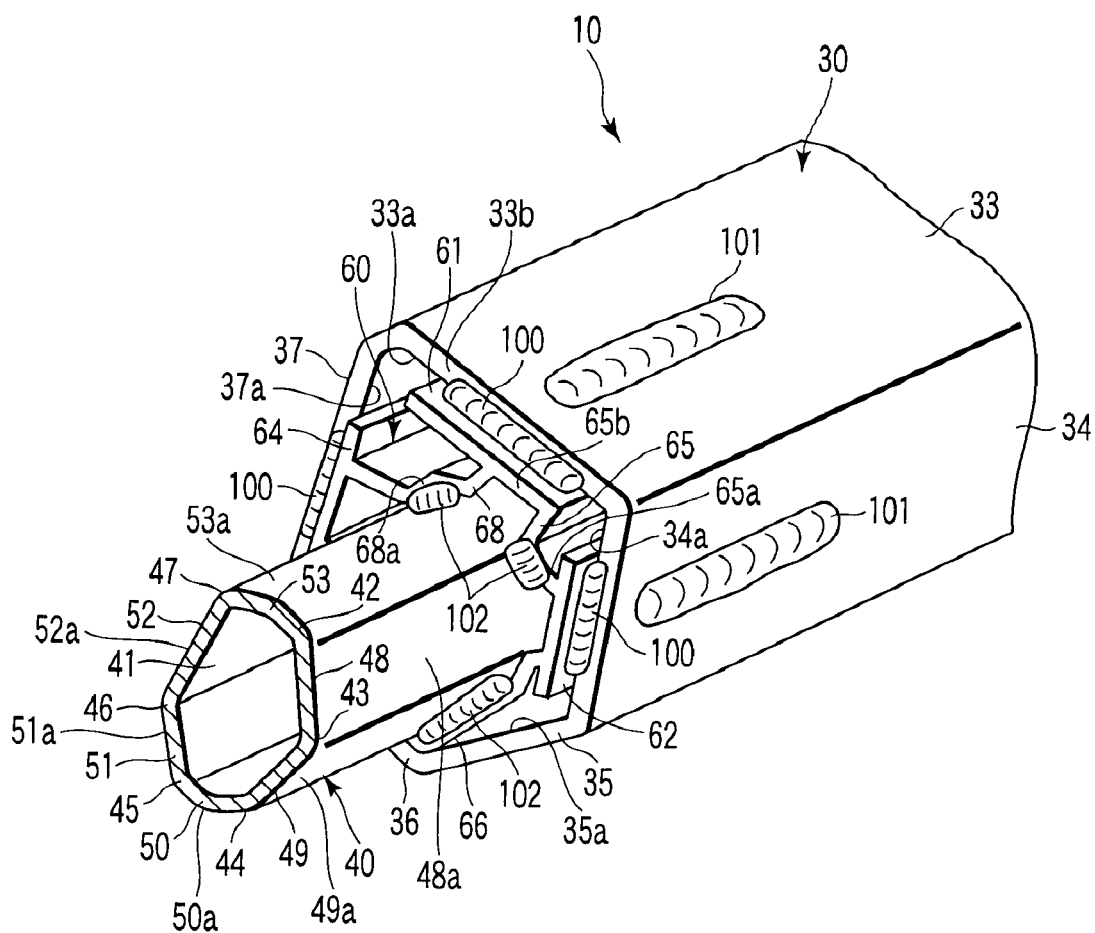
FIG. 4 is a perspective view of the deck cross-member shown in FIG. 1, illustrating the joint member of the deck cross-member.

FIG. 4 shows the joint member 60, illustrating how the member 60 couples the first pipe 30 and the second pipe 40.

The first pipe 30 has been made by extrusion molding. As shown in FIG. 3, the first pipe 30 therefore has a cross section 31 that is uniform all along is axis A, as viewed in a plane perpendicular to its axis A. The cross section 31 is defined as first cross section in the present invention. The first pipe 30 is made of aluminum.

As shown in FIG. 1, the first pipe 30 constitutes that part of the deck cross-member 10 which lies at the side of the driver's seat. Therefore, a support member (not shown), for example, fastens the steering shaft 26b to a supporting part 32 that is secured to the first pipe 30.

The steering shaft 26b of the steering unit 26 should be supported as rigidly as possible, from a safety point of view. The more rigid the deck cross-member 10 is, the more rigidly it can support the steering shaft 26b.

Hence, it is desired that that part of the deck cross-member 10 which supports the steering shaft 26b should be as rigid as possible.

Therefore, the first pipe 30 has a cross section large enough to support the steering shaft 26b rigidly. Further, the first pipe 30 is designed not to interfere with other components (not shown) that the installment panel 24 contains.

In the present embodiment, the first pipe 30 has a cross section almost pentagonal as shown in FIG. 3, so that the first pipe 30 may not interfere with the other components in the installment panel 24.

The first pipe 30 has a first wall 33, a second wall 34, a third wall 35, a fourth wall 36, and the fifth wall 37. The first to fifth walls 33, 34, 35, 36 and 37 are adjacent to one another and are arranged clockwise in FIG. 5.

The inner surface 33a of the first wall 33 is a plane that is parallel to the axis A. The inner surface 34a of the second wall 34 is a plane that is parallel to the axis A. The inner surface 35a of the third wall 35 is a plane that is parallel to the axis A. The inner surface 36a of the fourth wall 36 is a plane that is parallel to the axis A. The inner surface 37a of the fifth wall 37 is a plane that is parallel to the axis A.

As shown in FIG. 1, the second pipe 40 is that part of the deck cross-member that lies at the side of the passenger's seat. The second pipe 40 has been made by extrusion molding. The second pipe 40 therefore has a cross section 41 that is uniform all along is axis B, as viewed in a plane perpendicular to its axis B. The cross section 41 is defined as second cross section in the present invention. The second pipe 40 is made of aluminum.

That part of the deck cross-member 10, which lies at the side of the passenger's seat, does not influences so much the rigidity required for supporting the steering shaft 26. Hence, the cross section 41 of the second pipe 40 need not be as large as the cross section 31 of the first pipe 30.

As described above, the cross section 41 of the second pipe 40 is designed not to interfere with the other components that the installment panel 24 contains. In the present embodiment, the cross section 41 of the second pipe 40 is almost hexagonal as shown in FIG. 3, so that the second pipe 40 may not interfere with the other components.

The cross section 41 of the second pipe 40 has first to sixth corners 42, 43, 44, 45, 46 and 47. The second pipe 40 has a sixth wall 48, a seventh wall 49, an eighth wall 50, a ninth wall 51, a tenth wall 52, and the twelfth wall 53.

The sixth wall 48 connects the first corner 42 and the second corner 43, forming a smooth surface. The outer surface 48a of the sixth wall 48 extends along the axis B. The seventh wall 49 connects the second corner 43 and the third corner 44, forming a smooth surface. The outer surface 49a of the seventh wall 49 extends along the axis B.

The eighth wall 50 connects the third corner 44 and the fourth corner 45, forming a smooth surface. The outer surface 50a of the eighth wall 50 extends along the axis B. The ninth wall 51 connects the fourth corner 45 and the fifth corner 46, forming a smooth surface. The outer surface 51a of the ninth wall 51 extends along the axis B.

The tenth wall 52 connects the fifth corner 46 and the sixth corner 47, forming a smooth surface. The outer surface 52a of the tenth wall 52 extends along the axis B. The eleventh wall 53 connects the sixth corner 47 and the first corner 42, forming a smooth surface. The outer surface 53a of the eleventh wall 53 extends along the axis B.

As FIG. 4 shows, the joint member 60 is inserted into the first pipe 30 and receives the second pipe 40 in it. The outer circumferential surface of the joint member 60 is secured to the inner circumferential surface of the first pipe 30. The second pipe 40 is therefore fixed in the joint member 60. As a result, the first pipe 30 and the second pipe 40 are coupled to each other by the joint member 60.

As shown in FIG. 3, the joint member 60 has a first fixed part 61, a second fixed part 62, a third fixed part 63, a fourth fixed part 64, a first coupling part 65, a second coupling part 66, a third coupling part 67, and a fourth coupling part 68.

Figure 5:
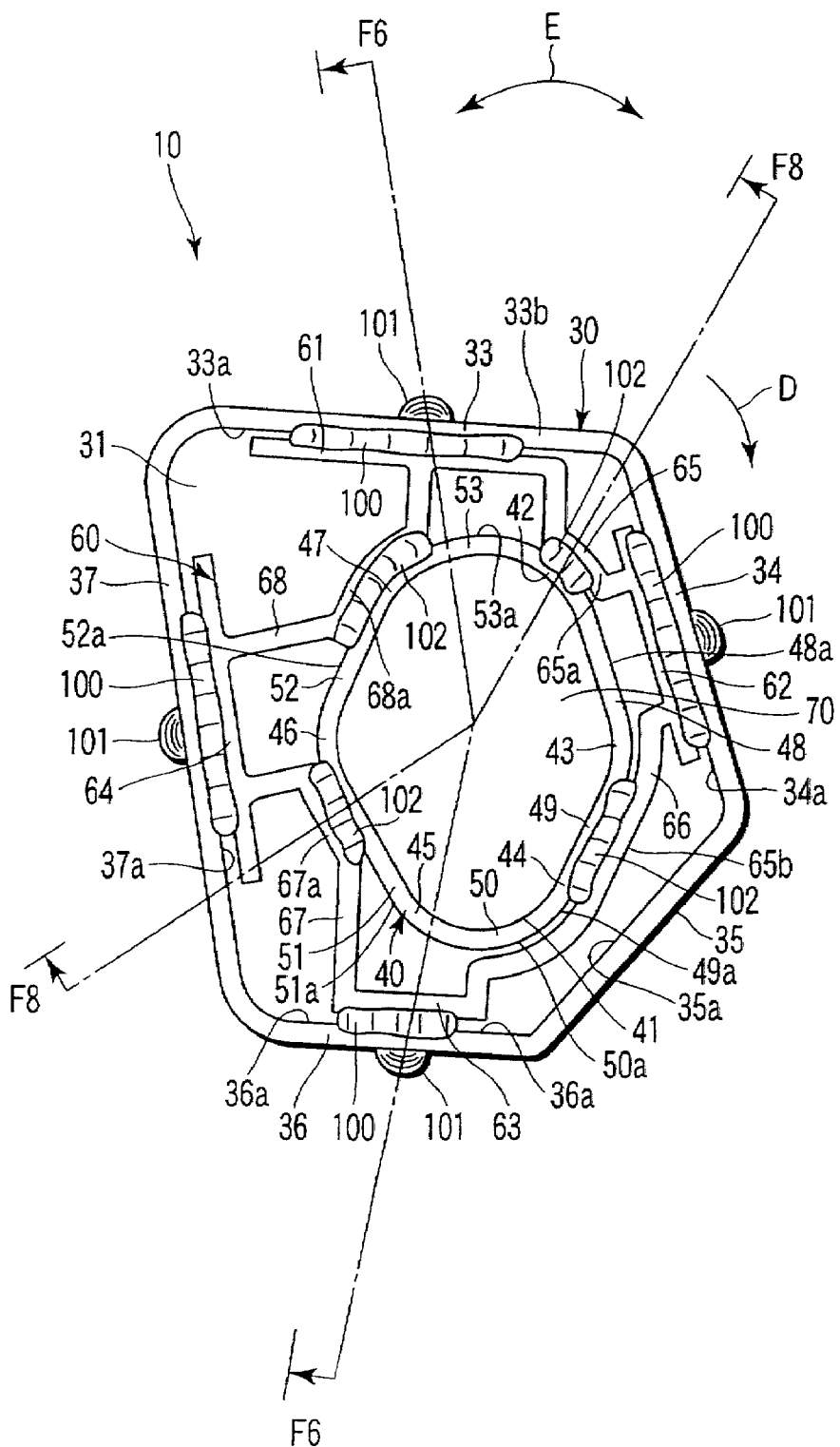
FIG. 5 is a front view of the deck cross-member shown in FIG. 1.

FIG. 5 is a front view of the deck cross-member 10 shown in FIG. 4, as viewed along the axis X of the joint member 60, which will be described later. As shown in FIGS. 3 to 5, the first to fourth fixed parts 61, 62, 63 and 64 are arranged, almost in a circle, and fixed to the inner surface of the first pipe 30, each with its surface turned outwards.

The joint member 60 is constituted by the first to fourth fixed parts 61, 62, 63 and 64 coupled, by the first to fourth coupling parts 65, 66, 67 and 68.

The shape of the joint member 60 will be described in detail. The first fixed part 61 is arranged, fixed to the inner surface 33a of the first wall 33 of the first pipe 30. The second fixed part 62 is arranged, fixed to the inner surface 34a of the second wall 34 of the second pipe 40. The third fixed part 63 is arranged, fixed to the inner surface 36a of the fourth wall 36 of the first pipe 30. The fourth fixed part 64 is arranged, fixed to the inner surface 37a of the fifth wall 37 of the first pipe 30.

The first coupling part 65 couples the first fixed part 61 and the second fixed part 62. The second coupling part 66 couples the second fixed part 62 and the third fixed part 63. The third coupling part 67 couples the third fixed part 63 and the fourth fixed part 64. The fourth coupling part 68 couples the fourth fixed part 64 and the first fixed part 61.

The first to fourth coupling parts 65, 66, 67 and 68 constitute a receptacle unit 70, which contains the first pipe 40.

The receptacle unit 70 will be described more specifically. The first coupling part 65 extends inwards from one end of the first fixed part 61. The first coupling part 65 extends inwards for a predetermined distance, is bent at its bent part 65a, and then is connected to that part of the second fixed part 62, which faces the first fixed part 61.

The third coupling part 67 extends inwards for a predetermined distance from that end of the third fixed part 63, which lies at the fourth fixed part, is bent at its bent part 67a, further extends toward the fourth fixed part 64, and is connected to that part of the fourth fixed part 64, which faces the third fixed part 63.

The fourth coupling part 68 extends inwards for a predetermined distance from that part of the fourth fixed part 64, which lies first fixed part 61, is bent at its bent part 68a, further extends toward the first fixed part 61, and is connected to that part of the first fixed part 61, which faces the fourth fixed part 64.

The bent part 65a is shaped, extending along the first corner 42, and therefore supports the first corner 42 of the second pipe 40. The coupling part 66 is shaped, extending along the second corner 43 and the third corner 44, and therefore supports these corners of the second pipe 40. The bent part 67a is shaped, extending along the fifth corner 46, and therefore support the fifth corner 46. The bent part 68a is shaped, extending along the sixth corner 47, and therefore support the sixth corner 47.

The first to third bent parts 65a, 67a and 68a and the second coupling part 66, which are so shaped as described above, constitute the receptacle unit 70.

The bent part 65a is arranged between the first fixed part 61 and the second fixed part 62. The second coupling part 66 is arranged between the second fixed part 62 and the third fixed part 63. The bent part 67a is arranged between the third fixed part 63 and the fourth fixed part 64. The bent part 68a is arranged between the fourth fixed part 64 and the first fixed part 61.

The joint member 60 thus formed has a cross section that is uniform all along its axis X, as viewed in a plane perpendicular to the axis X. The joint member 60 is formed by, for example, extrusion molding. Alternatively, it may be made by die-casting or casting.

It will be explained how the first pipe 30 and the joint member 60 are fastened to each other and how the second pipe 40 and the joint member 60 are fastened to each other.

Figure 6:
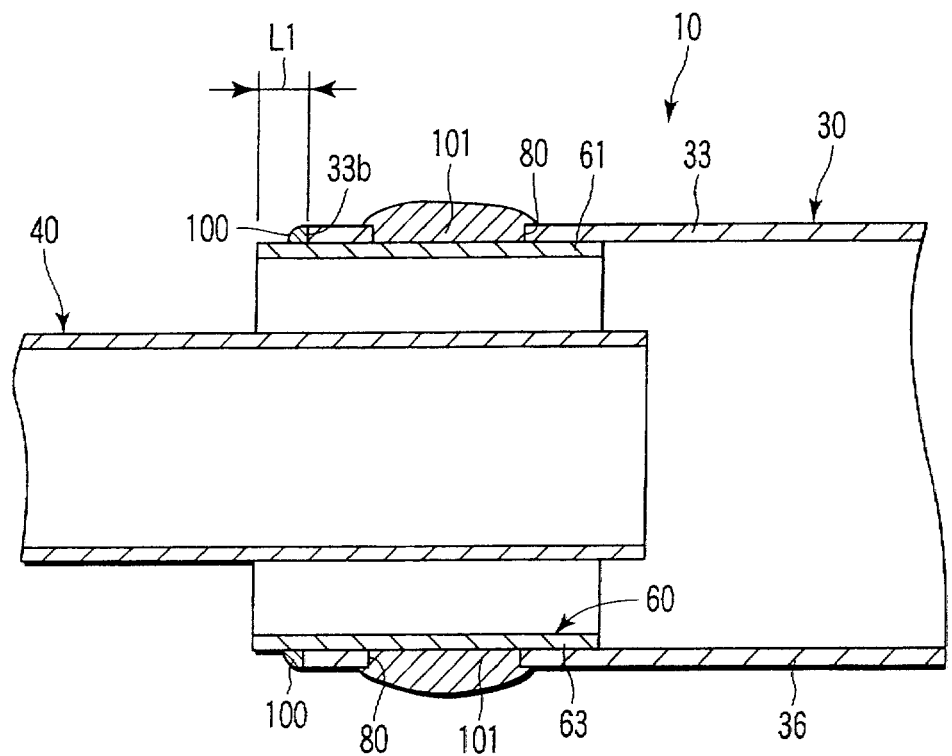
FIG. 6 is a sectional view of the deck cross-member shown in FIG. 4, taken along line F6-F6 shown in FIG. 5.

FIG. 6 is a sectional view of the deck cross-member 10, taken along line F6-F6 shown in FIG. 5. FIG. 6 shows the first pipe 30, the second pipe 40 and the joint member 60 coupling the first and second pipes 30 and 40. As shown in FIG. 6, the joint member 60 is inserted into the first pipe 30, extending from this pipe 30 for distance L1. The distance L1 is, for example, about 10 mm.

The first pipe 30 and the joint member 60 are welded to each other and are thereby coupled with each other. FIG. 6 shows the first wall 33 and the first fixed part 61 welded to each other and the fourth wall 36 and the third fixed part 63 welded to each other.

Figure 9:
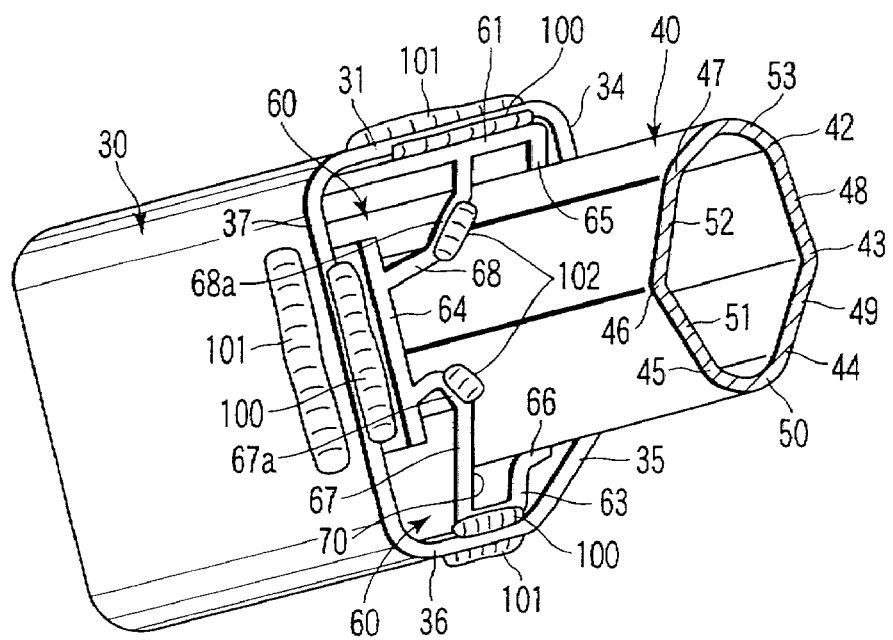
FIG. 9 is a perspective view, according to the another embodiment, of the joint section of the joint member shown in FIG. 1, as viewed from the fourth fixed part side.

As FIG. 6 shows, the distal end 33b of the first pipe 30 is fixed to the joint member 60. For example, the distal end 33b of the first pipe 30 is welded to the joint member 60, forming a welded section 100. The welded section 100 is a joint section that is so defined in the present invention. The first wall 33 has a through hole 80 made in the part that overlaps the first fixed part 61 of the joint member 60. Via this hole 80, the first wall 33 and the first fixed part 61 are welded to each other, thus forming a welded section 101. The welded section 101 extends in the axial direction of the first pipe 30 and can be long. The welded section 101, i.e., through hole 80, may be elongated in the circumferential direction of the first pipe 30 as is illustrated in FIG. 9. Further, the welded section 101, i.e., through hole 80, may be a combination of a hole extending along the axial direction of the first pipe 30 and a hole extending along the circumference direction of the first pipe 30. The welding may preferably be MIG welding, TIG welding, laser welding, or the like.

The second wall 34 and the second fixed part 62 are welded, the fourth wall 36 and the third fixed part 63 are welded, the fifth wall 37 and the fourth fixed part 64 may be welded, in the same way as the first wall 33 and the first fixed part 61 are welded. Therefore, it will not be explained how they are welded.

To couple the first pipe 30 and the second pipe 40 firmly and strongly enough, the joint member 60 should preferably inserted into the first pipe 30 by a predetermined distance, for example, 50 to 100 mm.

As described above, the joint member 60 should preferably extend from this pipe 30 for about 10 mm, for example, so that it may be welded as desired. Thus, the joint member 60 should be, for example, 60 to 110 mm long, extending in the axial direction A.

Figure 7:
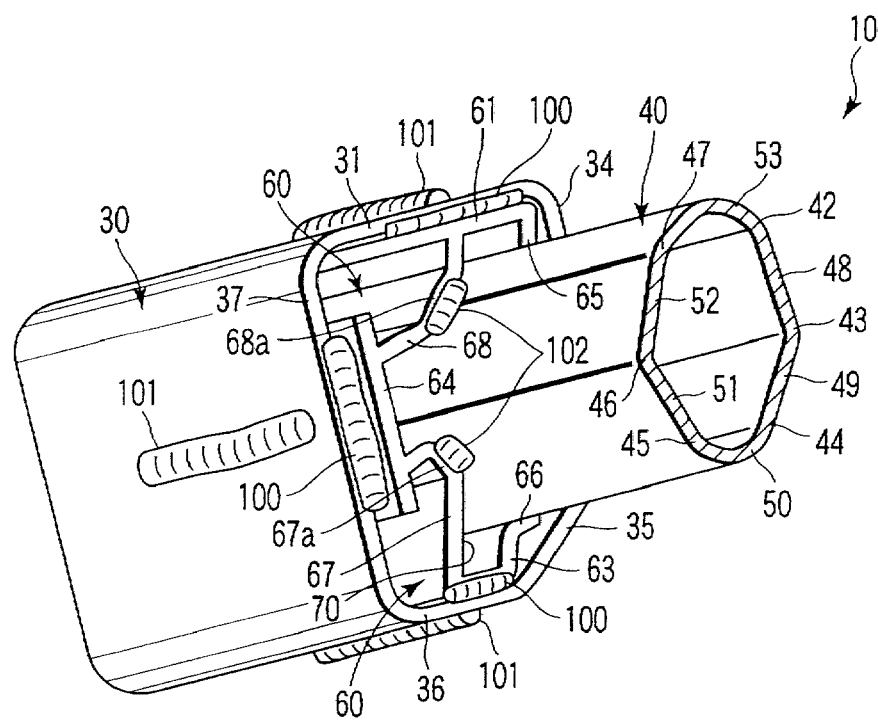
FIG. 7 is a perspective view of the joint member shown in FIG. 1, as viewed from the fourth fixed part side.

FIG. 7 is a perspective view showing the first and second pipes 30 and 40 coupled by the joint member 60, as viewed from the fourth fixed part 64.

Figure 8:
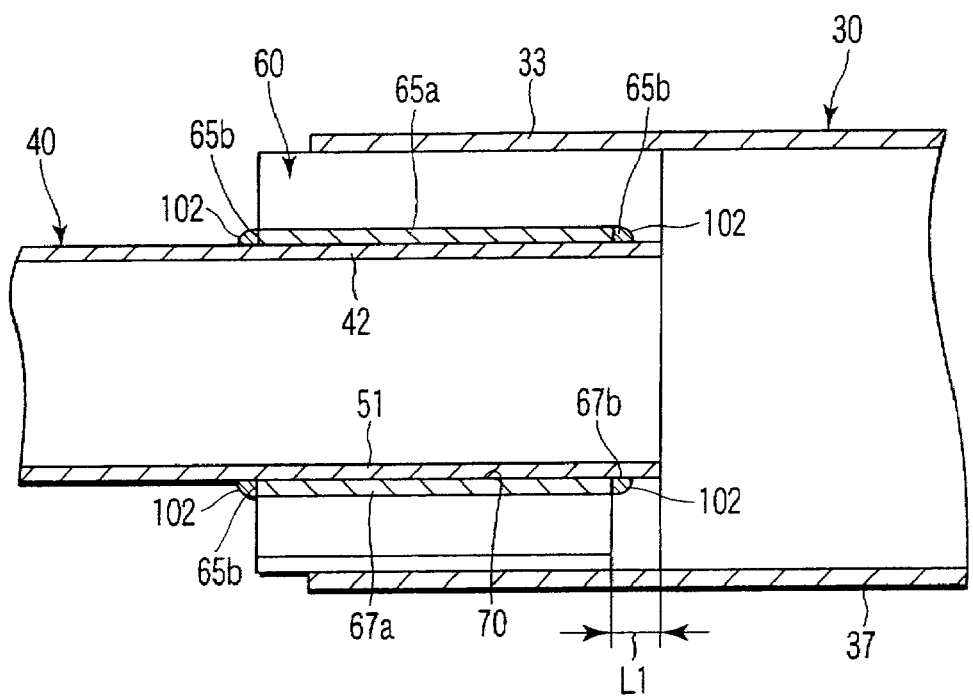
FIG. 8 is a sectional view of the deck cross-member shown in FIG. 4, taken along line F8-F8 shown in FIG. 5.

FIG. 8 is a sectional view of the deck cross-member, taken along line F8-F8 shown in FIG. 5. FIG. 8 shows how the second pipe 40 and the joint member 60 are welded to each other.

As shown in FIG. 8, the second pipe 40 is inserted in the receptacle unit 70, projecting from the joint member 60 for the distance L1. The second pipe 40 and the joint member 60 are welded and thereby fastened to each other.

The joint member 60 is welded to the second pipe 40, at both ends spaced in the axial direction. The ends 65b of the bent part 65a are thereby welded to that part of the second pipe 40, which lies near the first corner 42. A welded section 102 is thereby formed. The welded section 102 is a joint section that is so defined in the present invention. The both ends 65b of the bent part 67a are welded to that part of the second pipe 40, which lies near the fifth corner 46, forming the welded section 102.

The second coupling part 66 and the seventh wall 49 may be welded and the bent part 68a and that part of the second pipe 40, which lies near the sixth corner 47, may be welded in the same way as the bent part 65a is welded to that part of the second pipe 40, which lies near the first corner 42. Therefore, it will not be explained how they are welded.

As shown in FIGS. 4, 5 and 7, the welded section 100 of the first pipe 30 and joint member 60 and the welded section 102 of the second pipe 40 and joint member 60 are alternately arranged in the circumferential direction E of the joint member 60.

This arrangement will be described in more detail. As FIG. 5 shows, the welded section 102 of the bent section 65a and the first corner 42 lies forward in the clockwise direction D with respect to the welded section 100 of the first wall 33 and the first fixed part 61. Then, the welded section 100 of the second wall 34 and second fixed part 62 lies forwards in the clockwise direction D. Next, the welded section 102 of the second coupling part 66 and seventh wall 49 lies forwards in the clockwise direction D. Then, the welded section 100 of the fourth wall 36 and third fixed part 63 lies forwards in the clockwise direction. Moreover, the welded section 102 of that part of the second pipe 40, which exists near the fifth corner 46, and the bent part 67a lies forwards in the clockwise direction. Further, the welded section 100 of the fifth wall 37 and fourth fixed part 64 lies forwards in the clockwise direction. Still further, the welded section 102 of that part of the second pipe 40, which exists near the sixth corner 47, and the bent part 68a lies forwards in the clockwise direction.

A method of manufacturing the deck cross-member 10 configured as described above will be explained.

First, the first pipe 30, the second pipe 40, and the joint member 60 are so position as shown in FIG. 3.

Next, the second pipe 40 is inserted into the receptacle unit 70 of the joint member 60 such that it projects from the unit 70 for about 10 mm. The joint member 60 and the second pipe 40 are then welded to each other. More precisely, that part of the second pipe 40, which lies near the first corner 42, is welded to the bent section 65a. Then, the second coupling part 66 and the seventh wall 49 are welded. Further, the second coupling part 66 and the seventh wall 49 are welded to each other. That part of the second pipe 40, which lies near the fifth corner 46, is welded to the bent part 67a. That part of the second pipe 40, which lies near the sixth corner 47, is welded to the bent part 68a.

Then, as shown in FIGS. 6 and 8, the joint member 60 is inserted into the first pipe 30 such that the joint member 60 projects from the first pipe 30 for about 10 mm. Then, the first pipe 30 and the joint member 60 are welded to each other.

More specifically, the first wall 33 and the first fixed part 61 are welded. The second wall 34 and the second fixed part 62 are welded. The fourth wall and the third fixed part 63 are welded. The fifth wall 37 and the fourth fixed part 64 are welded.

As specified above, the second pipe 40 and the joint member 60 are welded to each other and the first pipe 30 and the joint member 60 are welded to each other. As a result, the deck cross-member 10 is produced.

In the deck cross-member 10 thus produced, the first pipe 30 and the second pipe 40 are coupled to each other by the joint member 60. Hence, the open end of the first pipe 30 need not be deformed so that it may be fitted in the second pipe 40. Not is it necessary to deform the open end of the second pipe 40 so that the second pipe 40 may be fitted in the first pipe 30.

If the first pipe 30 or the second pipe 40 must be deformed, the first and second pipes 30 and 40 should be ductile enough to be so deformed. If this is the case, the material of the first and second pipes 30 and 40 will be limited.

In the present invention, the use of the joint member 60 renders it unnecessary to deform the first pipe 30 or the second pipe 40. Thus, the first and second pipes 30 and 40 can be made of aluminum that is poor in ductility but is light metal.

Since the first and second pipes 30 and 40 can be made of light material, the deck cross-member 10 can be light. In other words, there is freedom of selecting materials for the first and second pipes 30 and 40, and the weights of the first and second pipes 30 and 40 can be effectively decreased.

The first and second pipes 30 and 40 have a plurality of surfaces each. Therefore, the first pipe 30 can be welded to the joint member 60 at more parts than otherwise. Similarly, the second pipe 40 can be welded to the joint member 60 at more parts than otherwise.

Further, as described above, the welded section of the first pipe 30 and joint member 60 and the welded section of the second pipe 40 and joint member 60 are alternately arranged in the circumferential direction E of the joint member 60. In such a structure, they can be very rigid. Even if the first pipe 30 and the second pipe 40 are welded at fewer parts.

Still further, the welded sections of the first pipe 30 and joint member 60 and the welded sections of the second pipe 40 and joint member 60 are arranged as shown in FIG. 5, almost in a circle, as viewed in the axial direction X of the joint member 60. The first pipe 30, the second pipe 40, and the joint member 60 can be coupled more firmly than otherwise.

The first and second pipes 30 and 40 and the joint member 60 are aluminum pipes, all made by extrusion molding. The deck cross-member 10 is formed by inserting the second pipe 40 into the receptacle unit 70 of the joint member 60 and welding the second pipe 40 and the joint member 60 to each other, and by inserting the joint member 60 into the first pipe 30 and welding the first pipe 30 and the joint member 60 to each other.

Since the first and second pipes 30 and 40 and the joint member 60 are aluminum pipes made by extrusion molding, these pipes 30 and 40 and the joint member 60 can be produced at low cost and they can be improved in terms of dimensional precision.

That is, the deck cross-member 10 can be manufactured at low cost and can be improved in dimensional precision.

Figure 10:
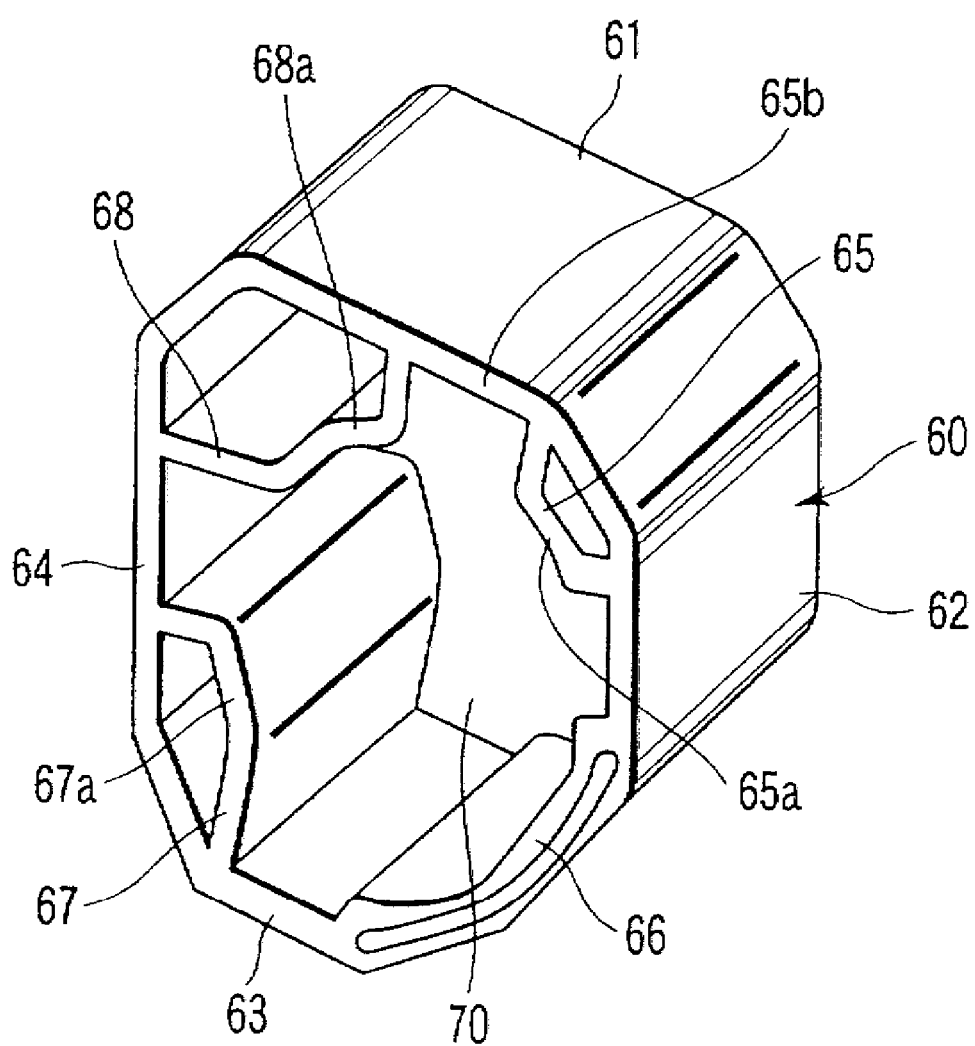
FIG. 10 is a perspective view of the joint member of a deck cross-member according to a second embodiment of the present invention.

A deck cross-member 10 according to the second embodiment of the present invention will be described, with reference to FIG. 10. The components similar to those of the first embodiment are designated by the same reference numbers and will not be described.

The present embodiment differs from the first embodiment in the shape of the joint member 60. In any other structural respect, it may be similar to the first embodiment.

The joint member of this embodiment will be described. FIG. 10 is a perspective view of the joint member 60 of this embodiment. As shown in FIG. 10, the first to fourth fixed parts 61, 62, 63 and 64 are connected to one another, forming a member having a smooth surface.

The joint member 60 thus shaped may be made by extrusion molding. Alternatively, the fixed parts may be connected, each to the adjacent ones by using other members.

The present embodiment achieves the same advantages as the first embodiment. In addition, this embodiment can be manufactured with higher safety, because the joint member 60 has fewer corners than in the first embodiment.

In the embodiments described above, the first pipe 30 and the second pipe 40 have a pentagonal cross section and a hexagonal cross section, respectively. Their cross sections are not limited to these. They only need to have a polygonal cross section.

In the present invention, the material of the first pipe and second pipe is not limited to a specific one. These pipes can be made of light material. Hence, the deck cross-member can be effectively light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A deck cross-member, comprising:
 a first pipe which is configured to support a steering unit and which has a first cross section uniform along an axial direction as viewed in a plane perpendicular to the axial direction;
 a joint member which is inserted in the first pipe and secured to the first pipe and which has a receptacle unit; and
 a second pipe which is inserted in the receptacle unit of the joint member, secured to the joint member and has a second cross section uniform along an axial direction as viewed in a plane perpendicular to the axial direction,
 wherein a through hole is made in the first pipe and opens at inner and outer circumferential surfaces of the first pipe, and the joint member is welded to a rim of the through hole and secured to the first pipe.

2. The deck cross-member according to claim 1, wherein the first pipe has a plurality of inner surfaces which extend in the axial direction of the first pipe and which lie inside the first pipe.

3. The deck cross-member according to claim 2, wherein the inner surfaces of the first pipe are flat.

4. The deck cross-member according to claim 1, wherein the second pipe has a plurality of outer surfaces which extend in the axial direction of the second pipe and which lie outside the second pipe, the joint member is welded to the outer surface of the second pipe and secured to the second pipe, and joint sections between the first pipe and the joint member and joint sections between the second pipe and the joint member are alternately arranged in a circumferential direction of the joint member.

5. The deck cross-member according to claim 4, wherein the joint sections between the first pipe and the joint member and the joint sections between the second pipe and the joint member are alternately arranged in a circle wound an axial direction of the joint member.

6. The deck cross-member according to claim 1, wherein at least one of the first and second pipes is made of aluminum.

7. The deck cross-member according to claim 1, wherein the though hole is an elongated through hole.

8. The deck cross-member according to claim 1, wherein the joint member has a plurality of disconnected fixed parts that extend in a direction parallel to the inner circumferential surface of the first pipe and make contact with the inner circumferential surface.

9. The deck cross-member according to claim 1, wherein the joint member has at least one fixed part that extend in a direction parallel to the inner circumferential surface of the first pipe and makes contact with the inner circumferential surface, and an end of the first pipe is welded to the at least one fixed part.

10. The deck cross-member according to claim 1, wherein the joint member has a plurality of disconnected coupling parts that extends in a direction parallel to an outer circumferential surface of the second pipe and makes contact with the outer circumferential surface.

11. The deck cross-member according to claim 1, wherein the joint member has at least one coupling part that extends in a direction parallel to an outer circumferential surface of the second pipe and makes contact with the outer circumferential surface, and an end of the at least one coupling part is welded to the outer circumferential surface.

* * * * *

UNITED STATES PATENT AND TRADEMARK OFFICE
CERTIFICATE OF CORRECTION

PATENT NO. : 7,458,625 B2  
APPLICATION NO. : 11/806934  
DATED : December 2, 2008  
INVENTOR(S) : Yusuke Kimura et al.

Page 1 of 1

It is certified that error appears in the above-identified patent and that said Letters Patent is hereby corrected as shown below:

On Title Page, Item (73) should read
-- Assignee: Mitsubishi Aluminum Company, Ltd.
            Mitsubishi Jidosha Kogyo Kabushiki Kaisha --.

Signed and Sealed this

Seventh Day of July, 2009

JOHN DOLL
*Acting Director of the United States Patent and Trademark Office*